United States Patent
Russo et al.

(10) Patent No.: US 11,513,224 B2
(45) Date of Patent: Nov. 29, 2022

(54) MULTI-STATIC COHERENT LIDAR

(71) Applicant: Analog Photonics LLC, Boston, MA (US)

(72) Inventors: Peter Nicholas Russo, Somerville, MA (US); Ehsan Shah Hosseini, Milton, MA (US)

(73) Assignee: Analog Photonics LLC, Boston, MA (US)

( * ) Notice: Subject to any disclaimer, the term of this patent is extended or adjusted under 35 U.S.C. 154(b) by 840 days.

(21) Appl. No.: 16/402,964

(22) Filed: May 3, 2019

(65) Prior Publication Data

US 2019/0339389 A1 Nov. 7, 2019

Related U.S. Application Data

(60) Provisional application No. 62/821,427, filed on Mar. 20, 2019, provisional application No. 62/666,110, filed on May 3, 2018.

(51) Int. Cl.
*G01S 17/42* (2006.01)
*H01Q 3/26* (2006.01)
*G01S 7/282* (2006.01)

(52) U.S. Cl.
CPC .............. *G01S 17/42* (2013.01); *G01S 7/282* (2013.01); *H01Q 3/2676* (2013.01)

(58) Field of Classification Search
CPC ........ G01S 17/42; G01S 7/282; H01Q 3/2676
USPC ............................. 356/4.01; 342/5, 51, 374
See application file for complete search history.

(56) References Cited

U.S. PATENT DOCUMENTS

| | | |
|---|---|---|
| 4,950,880 A | 8/1990 | Hayner |
| 5,606,736 A | 2/1997 | Hasler et al. |
| 6,485,150 B1 | 11/2002 | Driggers et al. |
| 7,397,568 B2 | 7/2008 | Bryce et al. |
| 7,786,928 B2 | 8/2010 | Hansen et al. |
| 9,740,079 B1 | 8/2017 | Davids et al. |
| 2002/0196179 A1 | 12/2002 | Mattox |

(Continued)

OTHER PUBLICATIONS

Idell et al., "Image synthesis from nonimaged laser-speckle patterns", Optics Letters, vol. 12, No. 11, pp. 858-860, Nov. 1987.

(Continued)

*Primary Examiner* — Bo Fan
(74) *Attorney, Agent, or Firm* — Young Basile Hanlon & MacFarlane, P.C.

(57) ABSTRACT

At least one beam of an optical wave is transmitted along a transmission angle toward a target location from a send aperture of a transmitter. A collected optical wave is received at receive apertures of two or more receivers. Each receiver comprises: a receive aperture arranged in proximity to at least one of the send aperture or a receive aperture of a different receiver, an optical phased array within the receive aperture, which receives at least a portion of a collected optical wave arriving at the receive aperture along a respective collection angle, and a detector that provides a signal based on the received portion of the collected optical wave. An estimated distance associated with the collected optical wave is determined based on a combination that includes a respective component corresponding to each of two or more of the signals provided from the detectors of the two or more receivers.

21 Claims, 11 Drawing Sheets

(56) References Cited

U.S. PATENT DOCUMENTS

| | | |
|---|---|---|
| 2003/0038746 A1 | 2/2003 | Patel et al. |
| 2003/0132871 A1 | 7/2003 | Laflaquiere et al. |
| 2004/0246604 A1 | 12/2004 | Fiete et al. |
| 2006/0072117 A1 | 4/2006 | Ruth et al. |
| 2014/0044214 A1 | 2/2014 | Gossmann et al. |
| 2014/0376001 A1 | 12/2014 | Swanson |
| 2015/0104193 A1 | 4/2015 | Pierrottet et al. |
| 2017/0184450 A1 | 6/2017 | Doylend et al. |
| 2017/0350965 A1 | 12/2017 | Schmalenberg |
| 2017/0371227 A1 | 12/2017 | Skirlo et al. |
| 2018/0052378 A1 | 2/2018 | Shin et al. |
| 2018/0232208 A1 | 8/2018 | Chong et al. |
| 2018/0284274 A1 | 10/2018 | LaChapelle |
| 2018/0306925 A1 | 10/2018 | Hosseini et al. |
| 2018/0321569 A1 | 11/2018 | Spector et al. |
| 2018/0348592 A1* | 12/2018 | Hosseini ............ G02B 27/0087 |
| 2019/0004151 A1 | 1/2019 | Abediasl et al. |
| 2019/0339389 A1 | 11/2019 | Russo et al. |
| 2020/0217961 A1 | 7/2020 | Russo et al. |
| 2020/0319524 A1 | 10/2020 | Hosseini et al. |

OTHER PUBLICATIONS

Idell et al., "Image synthesis from nonimaged laser-speckle patterns: experimental verification", Optics Letters, vol. 14, No. 3, pp. 154-156, Feb. 1, 1989.

* cited by examiner

MULTI-STATIC COHERENT LIDAR

CROSS-REFERENCE TO RELATED APPLICATION(S)

This application claims the benefit of U.S. Provisional Application Ser. No. 62/666,110, entitled "Multi-Static Coherent LiDAR," filed May 3, 2018, the entire disclosure of which is hereby incorporated by reference, and U.S. Provisional Application Ser. No. 62/821,427, entitled "Multi-Static Coherent LiDAR," filed Mar. 20, 2019, the entire disclosure of which is hereby incorporated by reference.

STATEMENT AS TO FEDERALLY SPONSORED RESEARCH

This invention was made with government support under the following contract: DARPA Contract No. HR0011-16-C-0108. The government has certain rights in the invention.

TECHNICAL FIELD

This disclosure relates to multi-static coherent LiDAR.

BACKGROUND

Some LiDAR systems use a single aperture to transmit and receive light (referred to herein as a "monostatic" aperture configuration). Alternatively, some LiDAR systems use two apertures in close proximity—one for transmitting and one for receiving (referred to herein as a "bistatic" aperture configuration). Different systems optimize various aspects of the LiDAR configuration based on different criteria. An optical wave is transmitted from an optical source to target object(s) at a given distance and the photons backscattered from the target object(s) are collected. The optical source used in a continuous wave (CW) LiDAR system is typically a laser, which provides an optical wave that has as narrow linewidth and has a peak wavelength that falls in a particular range (e.g., between about 100 nm to about 1 mm, or some subrange thereof), also referred to herein as simply "light." Some LiDAR systems may be designed to use either a monostatic or bistatic aperture configuration, depending on a variety of tradeoffs that may be made in system performance and/or system design.

SUMMARY

In one aspect, in general, an apparatus includes: at least one transmitter comprising a send aperture configured to provide at least one beam of a transmitted optical wave along a transmission angle toward a target location; two or more receivers, each receiver comprising: a receive aperture arranged in proximity to at least one of the send aperture or a receive aperture of a different receiver, an optical phased array within the receive aperture, the optical phased array being configured to receive at least a portion of a collected optical wave arriving at the receive aperture along a respective collection angle, a detector configured to provide a signal based on the received portion of the collected optical wave; and circuitry configured to determine an estimated distance associated with the collected optical wave based at least in part on a combination that includes a respective component corresponding to each of two or more of the signals provided from the detectors of the two or more receivers.

In another aspect, in general, a method includes: providing at least one beam of a transmitted optical wave along a transmission angle toward a target location from a send aperture of a transmitter; receiving a collected optical wave at receive apertures of two or more receivers, each receiver comprising: a receive aperture arranged in proximity to at least one of the send aperture or a receive aperture of a different receiver, an optical phased array within the receive aperture, the optical phased array being configured to receive at least a portion of a collected optical wave arriving at the receive aperture along a respective collection angle, a detector configured to provide a signal based on the received portion of the collected optical wave; and determining an estimated distance associated with the collected optical wave based at least in part on a combination that includes a respective component corresponding to each of two or more of the signals provided from the detectors of the two or more receivers.

Aspects can include one or more of the following features.

Each detector comprises a coherent detector configured to optically combine the received portion of the collected optical wave with a local oscillator optical wave to provide a combined optical wave and to detect the combined optical wave to provide the signal.

There is a frequency shift between the local oscillator and the transmitted optical wave to enable heterodyne detection in coherent detectors.

Each signal comprises an amplitude and a phase angle, and the respective component corresponding to that signal comprises a quantity that is based on the amplitude and is independent from the phase angle.

The circuitry is configured to convert each signal to digital form and to process the signals in digital form to remove dependence on the phase angles.

At least one coherent detector is configured to use a first local oscillator optical wave to provide an in-phase combined optical wave and to use a second local oscillator optical wave shifted relative to the first local oscillator wave to provide a quadrature combined optical wave, and to provide the amplitude and phase angle in an In-phase/Quadrature (I/Q) space.

The circuitry is configured to perform a transform on a real-valued signal provided from one of the detectors to provide the amplitude and phase angle in a complex space of a resulting complex transform of the real-valued signal.

Each detector is configured to generate a current that represents a difference between photocurrents generated by a pair of balanced photodetectors.

A total quantity of the receive apertures is between 3 and 20.

A total quantity of the receive apertures is between 4 and 10.

A total quantity of send apertures is 1.

An area of each receive apertures is equal to an area of the send aperture within a factor of between 4/9 to 9/4.

The receive apertures are arranged along an axis in a plane in which the optical phased arrays are configured to provide steering of the respective collection angles using phases of elements of the optical phased arrays.

Each of the optical phased arrays of the receivers is configured to align the respective collection angle with the target location.

The transmitter comprises an optical phased array within the send aperture.

An area of each optical phased array within the receive apertures is equal to an area of the optical phased array with the send aperture within a factor between 4/9 to 9/4.

At least one optical phased array within the send aperture or at least one of the receive apertures is configured to steer a first angle using phases of elements of the optical phased array and to steer a second angle using wavelength.

The transmitter applies linear frequency modulation to the transmitted optical wave to enable the circuitry to determine the estimated distance.

The send aperture is further configured as a receive aperture in which an optical phased array is used to receive at least a portion of an optical wave having a different characteristic from a characteristic of the transmitted optical wave, and at least one of the receive apertures is used as a send aperture for providing a beam of an optical wave having the different characteristic.

The characteristic comprises at least one of: wavelength, time slot, or polarization.

Aspects can have one or more of the following advantages.

Using the techniques described herein, a LiDAR system may be optimized in various ways. For example, in some implementations, for a given total device area (e.g., for both send and receive apertures together), and for a given optical source output power, an increased number of backscattered photons are collected from the target object(s) while the background leakage light is reduced. Some implementations enable improved tolerance to speckle effects resulting from the interference from the backscattered light from rough (e.g., non-mirror) surfaces, and improved performance for both long-range and short-range target distances to a target location at which target objects may be expected.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In the case of a monostatic aperture configuration, there are several approaches for multiplexing the aperture for both transmit operation and receive operation. For example, some approaches include: (1) using a polarizer to transmit light in one polarization and receive light in the opposite (i.e., orthogonal) polarization, (2) time domain multiplexing, and/or (3) using non-reciprocal devices such as a circulator. While monostatic aperture configurations may use all of the available aperture space for both a send aperture that will transmit a light beam towards a target location and a receive aperture that will collect any backscattered light arriving at the same aperture, it may be difficult to achieve high enough isolation between the transmit and receive paths within the LiDAR system such that the receiver can detect small reflections from a target object without the receiver being saturated by leaked transmitted light. In a frequency modulated continuous wave (FMCW) LiDAR system, the backscattering inside the monostatic system leads to strong low frequency peaks that can reduce the signal-to-noise ratio (SNR) for actual target detection at higher frequencies. In a bistatic aperture configuration, light is transmitted from one aperture and received from a different aperture, overcoming the isolation challenges in a monostatic aperture configuration at the cost of reduced size for both the transmit and receive aperture within the available aperture space.

Figure 1:
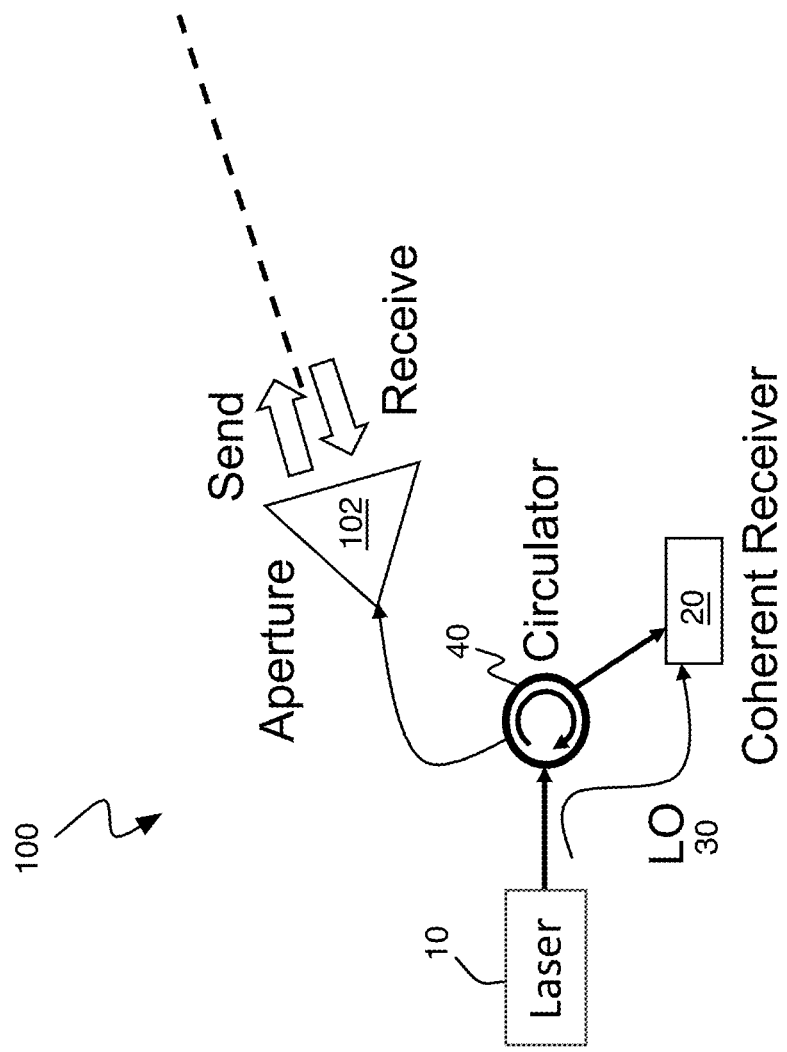
FIG. 1 is a schematic diagram of an example of a monostatic LiDAR system.
Figure 2:
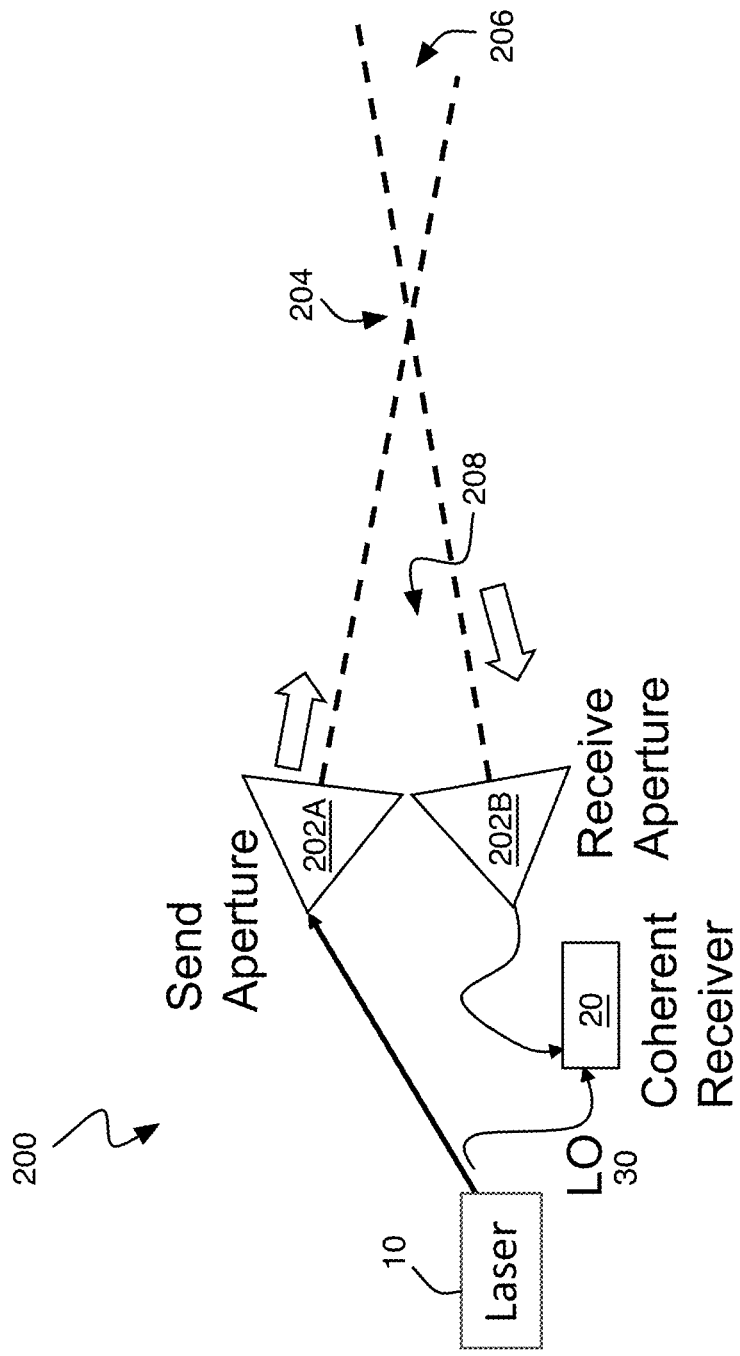
FIG. 2 is a schematic diagram of an example of a bistatic LiDAR system.

FIGS. 1 and 2 show examples of LiDAR systems using a monostatic aperture configuration 100 and a bistatic aperture configuration 200, respectively. Both systems include a laser 10, and a coherent receiver 20, used to mix received light with light of a local oscillator (LO) 30. The laser 10 may be a CW laser that has a narrow linewidth and low phase noise, for example, sufficient to provide a temporal coherence length that is long enough to perform coherent detection over the time scales of interest. The monostatic aperture configuration 100 also includes a circulator 40 for redirecting light in different directions. In the monostatic aperture configuration 100, an aperture 102 serves as both a send and receive aperture, so the transmission angle of the path from the aperture 102 to a target location and the collection angle of the path from the target location back to the aperture 102 are substantially the same (FIG. 1), regardless of the distance to the target location. While, in a bistatic aperture configuration 200, the path from a send aperture 202A to a target location 204 and the path from the target location 204 to a receive aperture 202B are different and result in different transmission and collection angles (FIG. 2). In some LiDAR systems, the transmission and collection angles are aligned for operation at an optimal target distance to the target location 204. As a result, operation at a further target distance 206 or a shorter target distance 208 may provide sub-optimal performance.

If the surface of a target object is not polished (e.g., like the surface of a metallic mirror) or is not otherwise configured as having a retro-reflective surface, the backscattered light experiences the random phase fluctuations that are imposed upon it by the surface roughness of the target object. The microscopic features on most rough surfaces lead to a randomized phase for the light backscattered from each point on the surface. This in turn leads to the speckle phenomenon, which is responsible for the interference patterns observed at the receive aperture. Due to the random walk nature of the interference pattern created by scattering from an extended surface with a with randomized phase, the amplitude of the collected light has a Rayleigh distribution and the intensity of the light collected (proportional to the number of photons entering the receive aperture) has an exponential statistical distribution. Therefore, for example, if a transmitted light beam is moved across a wall and on average 10 photons are collected back, for most target positions the aperture collects much less than 10 photons and every so often the receiver might collect tens of photons and saturate the circuitry of the receiver's detection system.

Figure 3A:
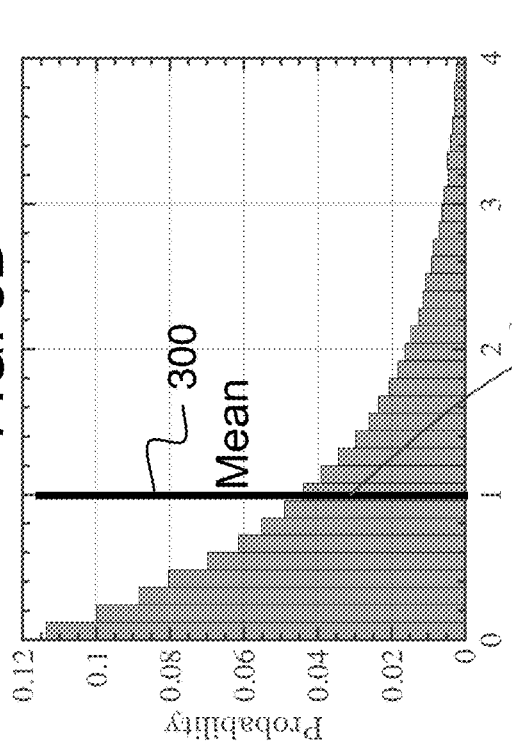
FIGS. 3A, 3B, and 3C are plots of example simulated detection results.
Figure 3B:
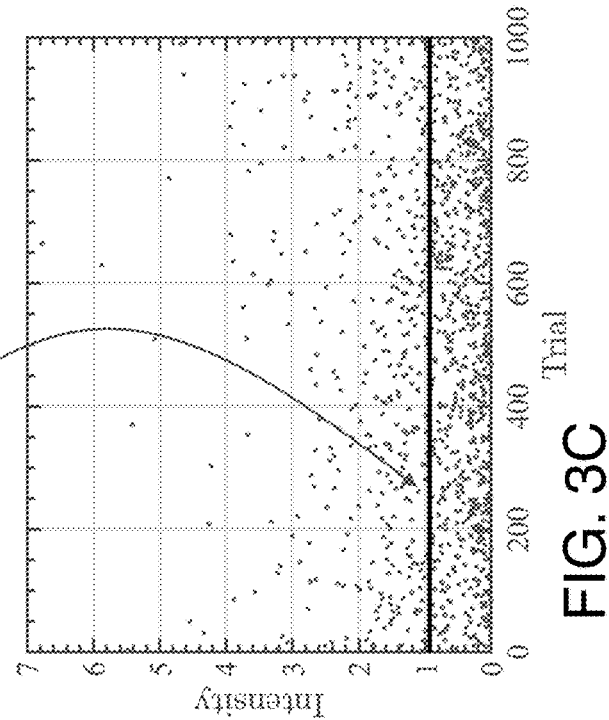
Figure 3C:
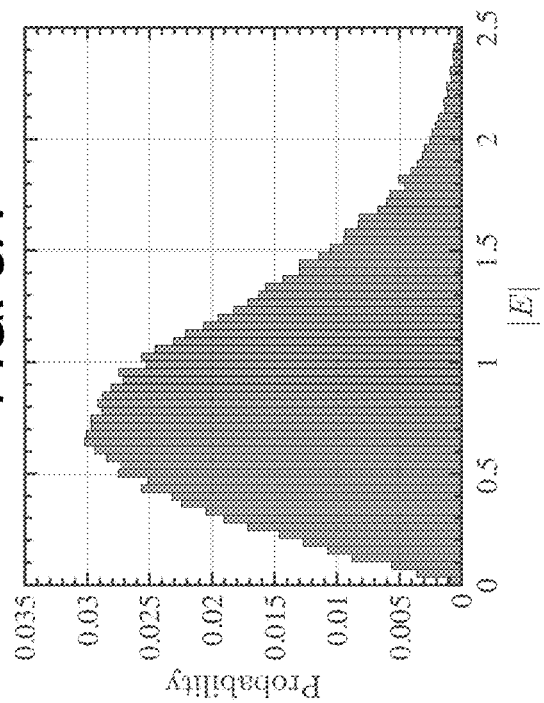

When the LiDAR system is collecting too few photons the collected light might be buried under the background noise and when too many photons are collected the light might be outside of the linear gain range of the detection system. FIGS. 3A, 3B, and 3C show examples of simulated detection results for effects of speckle in a LiDAR system. FIG. 3A shows a plot of the Rayleigh probability density for a particular normalized value of electric field amplitude. FIG. 3B shows a corresponding plot of a probability density for electric field intensity, which is exponential. FIG. 3C shows a Monte-Carlo simulation of a 1000 randomized trials for a normalized intensity. A normalized mean intensity value of 1 is shown (300) in the plots of FIGS. 3B and 3C. As FIG. 3C shows, when the average intensity is normalized to 1, most of the trials correspond to a value of less than unity while a few distinct trials result in intensities much larger.

Both the monostatic and bistatic aperture configurations of a LiDAR system potentially suffer from potential detrimental effects due to speckle in the system's coherent receiver. When there is only one receive aperture, whose size is approximately matched to the size of the send aperture, there is only one portion of a particular interference pattern (also called a "speckle realization") that is detected at the receiver. This limits the probability of detection in the receiver because of the exponential probability distribution of the signal collected from a single speckle realization.

For a given LiDAR system, typically the total usable area available for any number of send and receive apertures is limited by the size of the system or the size of the reticle allowable in a certain fabrication process if the LiDAR system is manufactured in a planar integrated optics flow. In a LiDAR system with a multi-static aperture configuration, this usable area is used for one or more send apertures and two or more receive apertures in an aperture arrangement. The total area used for the one or more send apertures divided by the total area used for the two or more receive apertures is referred to as the "send-to-receive ratio." The total area used for the two or more receive apertures divided by the total area used for the entire aperture arrangement is referred to as the "receive fill factor." These and other parameters can be optimized in various ways by appropriate design of the number of apertures and their sizes.

Figure 4B:
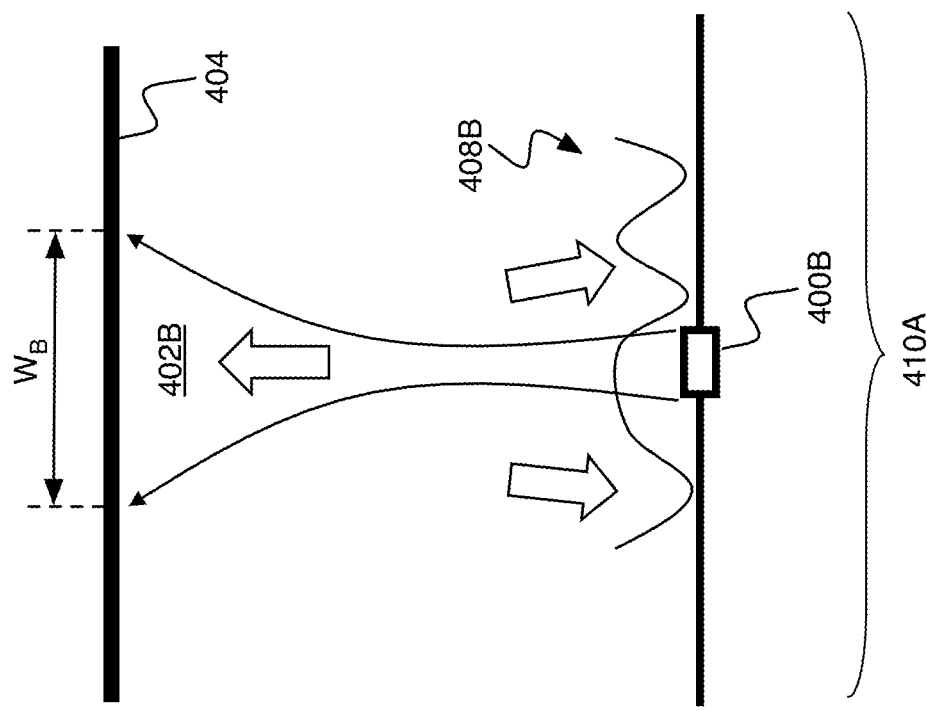
FIGS. 4A and 4B are schematic diagrams of examples of apertures and corresponding speckle patterns received from a target.
Figure 4A:
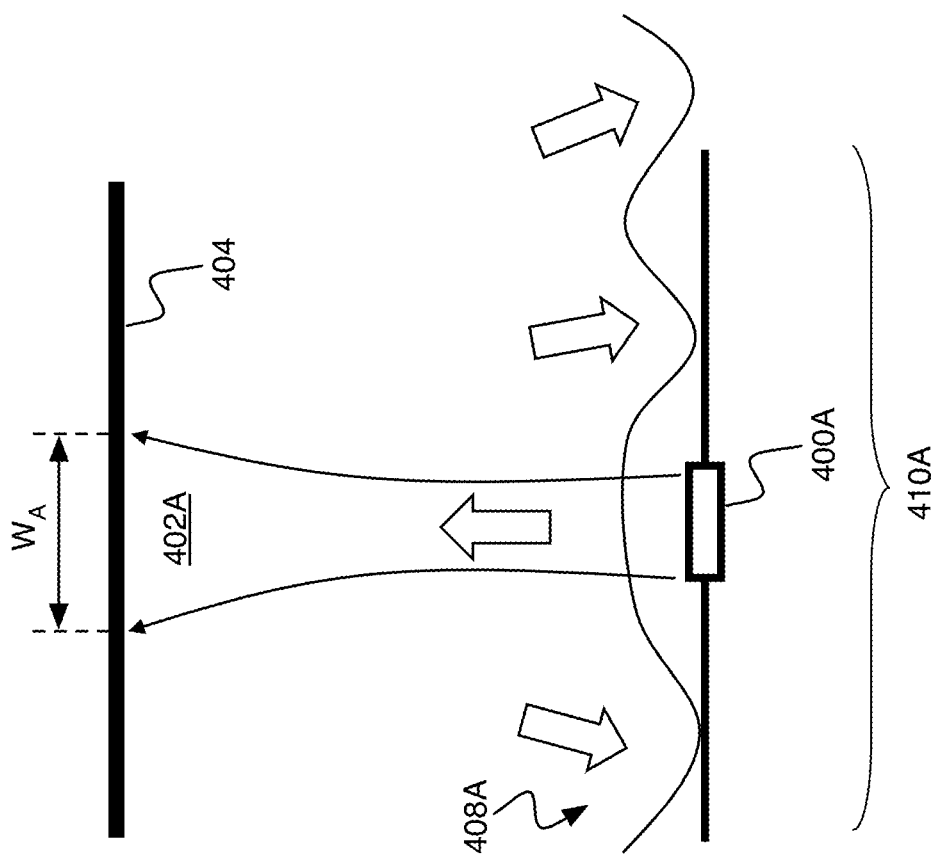

FIGS. 4A and 4B show examples of different send apertures having different sizes. For example, the send apertures can be a square shaped region that is substantially filled by the area of a two-dimensional optical phased array (OPA) transmitting a light beam that is steered by characteristics of the array, as described in more detail below. Assuming no aberrations in the system, for a particular send aperture 400A, 400B, the size $W_A$, $W_B$ of the diffraction limited transmitted light beam 402A, 402B in the far field is inversely proportional to the size of the send aperture 400A, 400B. This transmitted light beam 402A, 402B hits the surface 404 of a target object and illuminates a certain area on the surface of that target object. The backscattered light from the target object's illuminated area creates a speckle pattern 408A, 408B on the aperture arrangement 410A, 410B. The correlation length of the speckle pattern created on the aperture arrangement 410A, 410B is inversely proportional to the size of the illuminated area 406A, 406B. Therefore, the smaller send aperture 400B leads to a faster changing speckle pattern 408B (e.g., with smaller-sized speckle pattern bright/dark features created by constructive/destructive interference), and the larger send aperture 400A leads to a slower changing speckle pattern 408A (e.g., with larger-sized speckle pattern bright/dark features). The optimal quantity of and size of the two or more receive apertures within each of the aperture arrangements may be different depending on the size of the send aperture. For example, in some implementations, the size of each of the receive apertures is equal in size, or comparable in size (e.g., within a factor of 1/2 to 2 in diameter, and within a factor of 1/4 to 4 in area; or, within a factor of 2/3 to 3/2 in diameter, and within a factor of 4/9 to 9/4 in area) to the size of the send aperture. In some implementations, the sizes of the receive apertures are approximately equal to each other, but the size of the send aperture may be larger than the sizes of the receive apertures by a small amount (e.g., by 10% larger or 20% larger).

In some implementations, the aperture arrangement comprises a collection of at least three apertures for use in a coherent LiDAR system, placed in close proximity. At least one of the apertures is used as a send aperture for transmitting light towards a target location, and at least two of the apertures are used as receive apertures for receiving backscattered light that originated from that send aperture. In a multi-wavelength LiDAR system, there may be different apertures selected as a single send aperture for a given center wavelength, and all of the remaining apertures are selected as receive apertures for that given center wavelength (potentially with a frequency chirp imposed around that center wavelength). In a LiDAR system that uses optical phased arrays, a receive aperture can use an optical phased array to steer a collection angle, and a send aperture can use an optical phased array to steer a transmission angle, as described in more detail below. These optical phased arrays can have an array size (number of individual optically dispersive phase-controlled elements), and resulting transverse beam size, that are matched (or nearly matched) to each other in size.

Figure 5A:
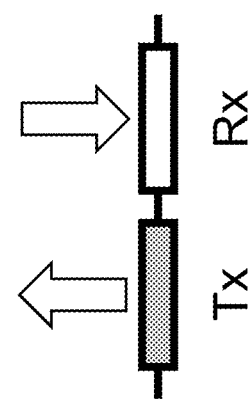
FIGS. 5A, 5B, and 5C are schematic diagram of example aperture arrays.
Figure 5B:
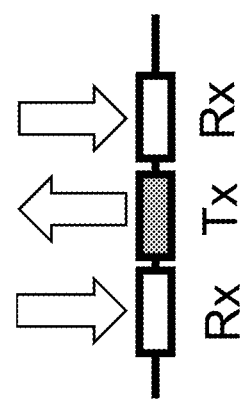
Figure 5C:

FIGS. 5A, 5B, and 5C show examples in which the apertures are arranged linearly along one dimension, where aperture size is shown as the width of identical square-shaped apertures (with the other dimension of aperture height being into the page in these examples). This type of linear aperture arrangement of N apertures may use one send aperture of size 1/N as a fraction of the total available space (e.g., along a long side of a rectangular area available for the aperture arrangement), and may fill the rest of the available aperture space with N−1 apertures also of size 1/N as a fraction of the available aperture space. The percentage of the total available aperture space that is used for receiving light approaches 100% as the number of receive apertures increases. As can be seen in FIGS. 5A, 5B, and 5C, in which N changes from 2 (FIG. 5A) to 3 (FIG. 5B) to 10 (FIG. 5C), as the number of receive apertures is increased (from 1 to 2 to 9), the relative size of the send aperture is decreased (from ½ to ⅓ to 1/10) and the fraction representing the receive fill factor increases (from ½ to ⅔ to 9/10). But, the send-to-receive ratio also decreases (from 1 to ½ to ⅑). A tradeoff may be made between receive fill factor and send-to-receive ratio such that an optimal number of apertures may be selected for any given system design. For example, in some system implementations, a value of N anywhere between 5 to 11 may provide an acceptable tradeoff. In other implementations, a wider range of N values may be tolerated (e.g., between 4 to 20), or there may be a value of N that maximizes certain performance parameters for given tolerances (e.g., N=9). With an odd value of N, the send aperture can be located in the center of the aperture arrangement, which may be desirable in some implementations (e.g., to reduce errors due to parallax effects for receive apertures furthest away from the send aperture). Similar properties would also hold for a two-dimensional arrangement of apertures within an available aperture space of square shape, where the send aperture may still be near the center in both dimensions. Also, other examples may use more than one aperture as a send aperture, with remaining apertures used as receive apertures, and may place the send aperture(s) in locations other than near the center.

In some implementations, the coherent detectors used to detect the light received at each receive aperture are coupled together to perform incoherent combination (also called "incoherent averaging"), where coherently detected phasors are processed to recover amplitudes whose absolute values or squared values are then added together as different components of the combination, optionally with different weights. For example, in some implementations, the coherent detection of each receive aperture can use an In-phase/Quadrature (I/Q) detection configuration using two versions of the LO that are phase shifted with respect to each other by 90 degrees. This yields a two-dimensional phasor (in an I/Q space) with an angle and an amplitude. In some implementations, the coherent detection of each receive aperture can yield a complex-valued transform (e.g., in the frequency domain) of time domain signal (e.g., a photocurrent from a single photodetector or a pair of balanced detectors), which also yields a two-dimensional phasor (in a complex space) with an angle and an amplitude. In either case, the angle of that phasor can be discarded, and the amplitude of the phasor can be recovered for each of the coherent receivers. Over each of the (N−1) receivers, that amplitude (the absolute value of the phasor), or the square of that amplitude, can then be summed or otherwise combined. In some implementations, the values being summed can be weighted in the sum differently for different receive apertures, where the weights may depend on various parameters (e.g., designed target distance). This discarding of the angle of the phasor may sacrifice how quickly a mean value of a detected signal increases, but may provide a more stable signal (e.g., with a lower standard deviation).

Even with a relatively large number of receive apertures, the size of the receive apertures can be kept large enough so that each receive aperture measures an uncorrelated speckle realization, increasing the speckle diversity of the LiDAR receivers compared to a monostatic or bistatic LiDAR system that uses a single receive aperture. As mentioned above, the probability distribution of number of photons collected at each receive aperture is exponential. Also, the noise at each coherent detector has an exponential distribution. Without being bound by theory, one expression for the incoherent combination of k spatially incoherent apertures leads to Erlang distributions for both signal and noise:

$$\text{Noise} \sim Erlang(k, 1)$$
$$\text{Signal} \sim Erlang\left(k, \frac{k}{SNR_{power} + k}\right)$$

Therefore, for high probabilities of detection (i.e., a threshold for a detected power level, or a number of photons being detected), there is a higher probability of false alarm (i.e., the threshold being exceeded due to noise photons rather than signal photons), without incoherent averaging (e.g., with one receive aperture of the same size as the multiple receive apertures) than there is with incoherent averaging. However, for low probabilities of detection, incoherent averaging has the higher false alarm rate. In other words, fewer speckle realizations (lower speckle diversity) is better when the probability of false alarm requirement is less stringent (i.e., a higher probability of false alarm is acceptable). More speckle realizations (higher speckle diversity) is better when the probability of false alarm requirement is more stringent (i.e., a lower probability of false alarm is acceptable).

Another useful feature enabled by the multi-static aperture configuration is that the mixing efficiency of the LiDAR system may be improved at short ranges as the Fraunhofer distance required for far field operation is reached faster for smaller apertures. In other systems, for objects at shorter distances than an assumed target distance, the far field Fraunhofer distance may not have been reached. But, when aperture size is smaller, as in some multi-static LiDAR systems, an object at a shorter distance may still be considered in the far field, and some of the benefits may still apply.

A variety of optimizations can also be made to the individual receive apertures and the optical elements (e.g., OPAs) used within each receive aperture. For example, the collection angle for each receive aperture may be independently tilted. Also, the light collected by each receive aperture can be focused to optimize the performance at different range.

Figure 6:
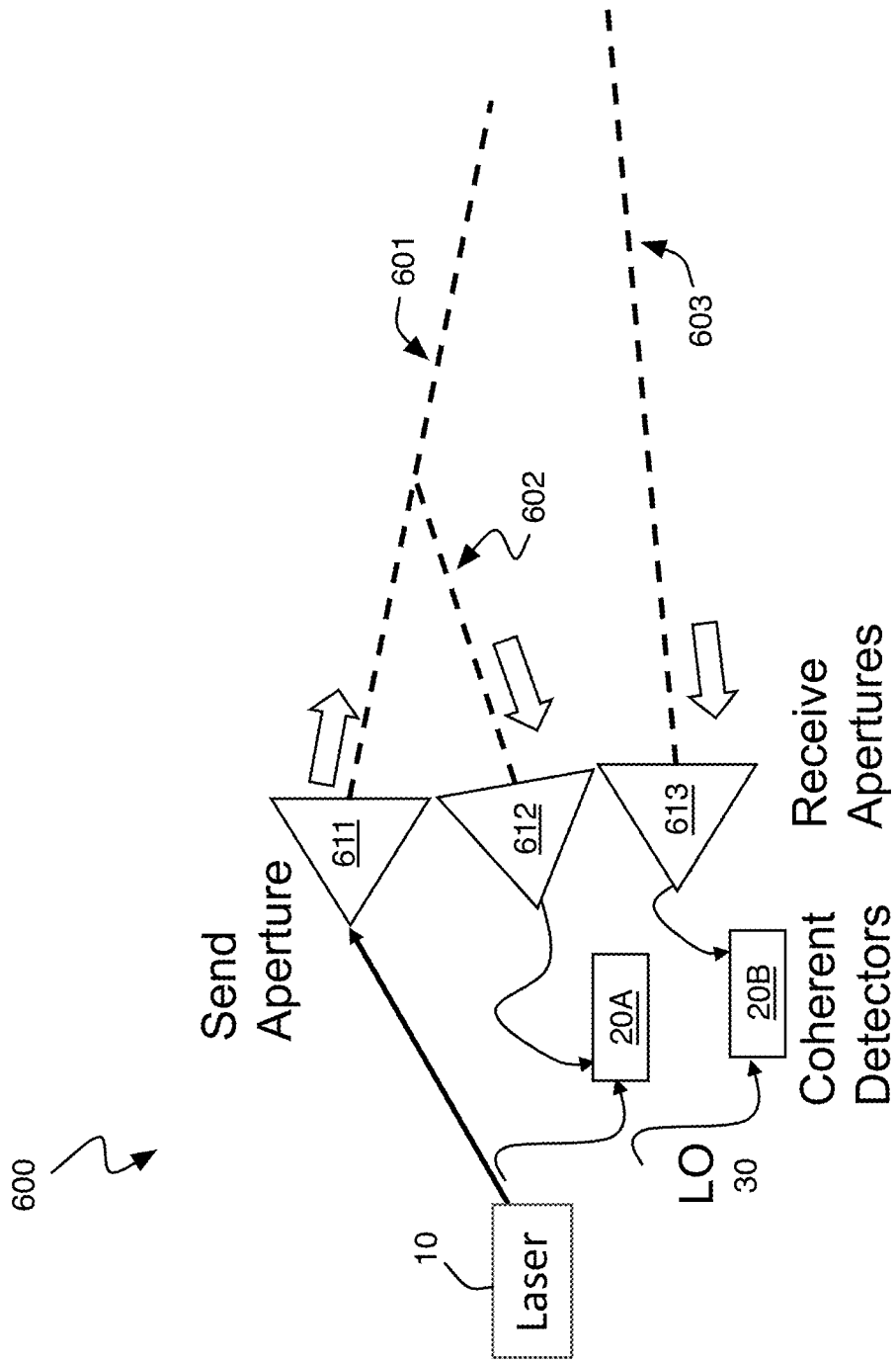
FIG. 6 is a schematic diagram of an example of a multi-static LiDAR system.

FIG. 6 shows an example of a LiDAR system using a multi-static aperture configuration 600. For a given transmission angle 601 from a send aperture 611, a first collection angle 602 into a receive aperture 612, and a second collection angle 603 into a receive aperture 613 can be independently tilted. The potential interference from the laser 10 light into the coherent receivers' 20A, 20B detectors is reduced by using separate apertures for transmit and receive (as in bistatic configurations). In the case where each aperture uses an OPA, the tilt (e.g., using phase steering and wavelength steering to control different angles) and focus (e.g., also using phases) of each OPA may be adjusted on-the-fly to adjust the range at which the LiDAR has the highest mixing efficiency.

Figure 7A:
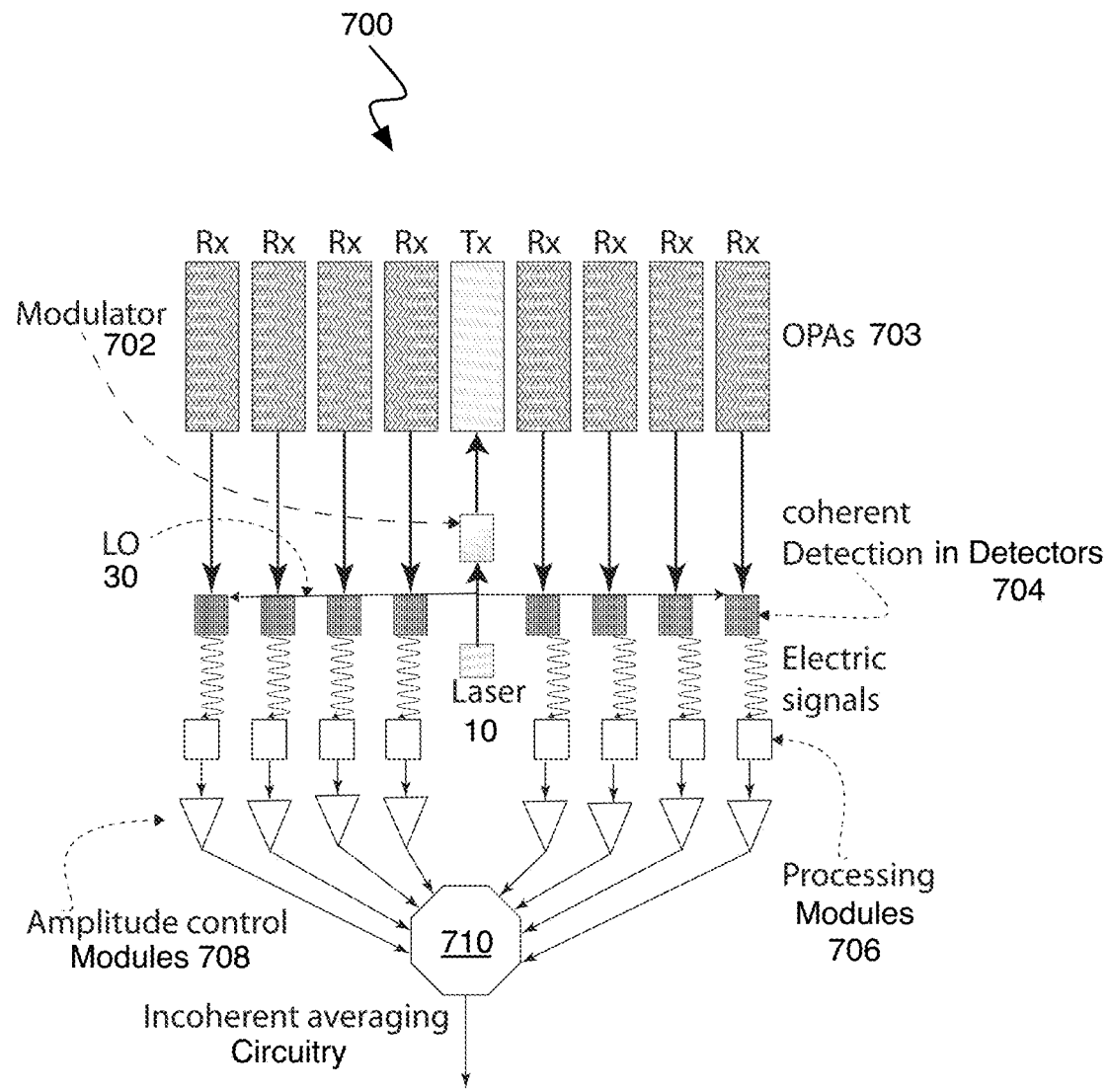
FIGS. 7A, 7B, 8, and 9 are schematic diagrams of various portions of examples of multi-static coherent LiDAR systems.

Another example of a multi-static aperture configuration for a coherent LiDAR system is shown in FIG. 7A. In this example, the laser 10 provides an optical wave that is transmitted from a transmit (Tx) OPA through a send aperture after it has been modulated by a modulator 702 (e.g., using FMCW modulation that imposes a linear chirp on the peak frequency corresponding to the transmitted wavelength). A group of OPAs 703 within respective apertures arranged in proximity to each other include 8 receive (Rx) OPAs that provide different received portions of a collected optical wave arriving at the receive apertures containing the Rx OPAs. The LO 30 is combined with each of the received portions of the collected optical wave, and the resulting combined optical waves are coherently detected by detectors 704. The detectors 704 may be implemented, for example, using balanced detection with photodetectors connected to yield an output current that is a difference between photocurrents generated by the two photodetectors, and/or homodyne detection that imposes a frequency shift on the LO 30 with respect to the peak frequency. The resulting electrical signals provided by the detectors 704 may then be processed in processing modules 706, including processing using analog-to-digital (A/D) conversion where the processing to recover the amplitude and discard the phase angle may be performed digitally. These recovered amplitudes (or the squares of the amplitudes) may also be weighted using amplitude control modules 708. These potentially weighted amplitudes are then be combined using circuitry 710 that is configured to perform the incoherent averaging described herein.

Figure 7B:
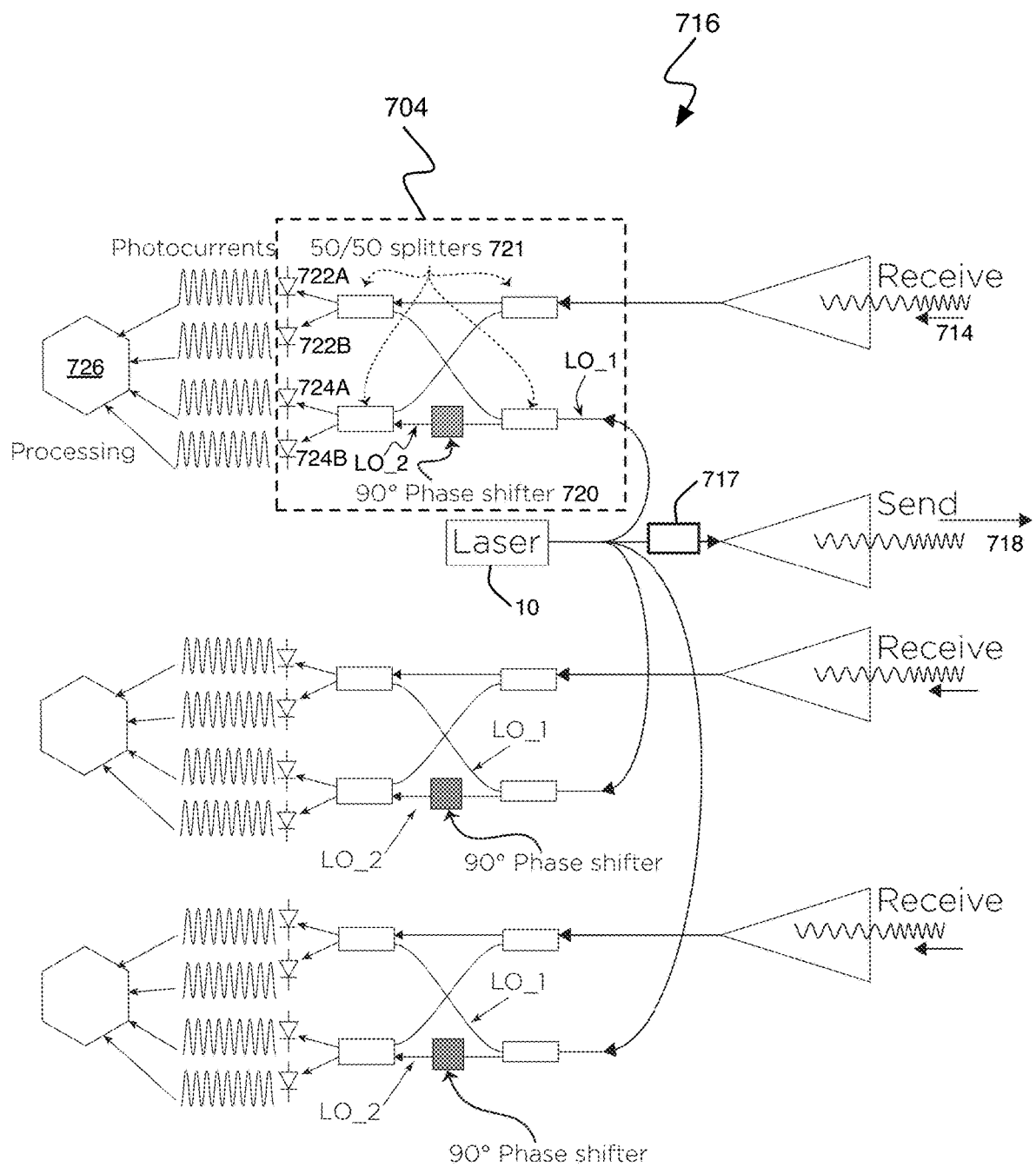

FIG. 7B shows an example of a detector 704 for detecting an optical wave 714 received at a receive aperture, in the context of a LiDAR system 716 that includes other elements including: the laser 10 coupled to modulator 717 for transmitting a modulated optical wave 718 from a send aperture, and other receive apertures and corresponding detectors. The detector 704 includes a 90-degree phase shifter 720 for providing a phase-shifted version LO_2 of an incoming local oscillator optical wave LO_1. A set of 50/50 splitters 721 are able to combine the optical wave 714 with the different versions of the LO to perform I/Q detection. The detector 704 includes a first pair of photodetectors 722A, 722B for detecting an in-phase (I) signal based on a corresponding pair of photocurrents that may be subtracted in a balanced detection arrangement, and a second pair of photodetectors 724A, 724B for detecting a quadrature (Q) signal based on a corresponding pair of photocurrents that may be subtracted in a balanced detection arrangement. From all four of these photocurrents a processing module 726 is able to extract a phase angle and an amplitude associated with the optical wave 714. Other implementations of the detector 704 are also possible.

Figure 8:
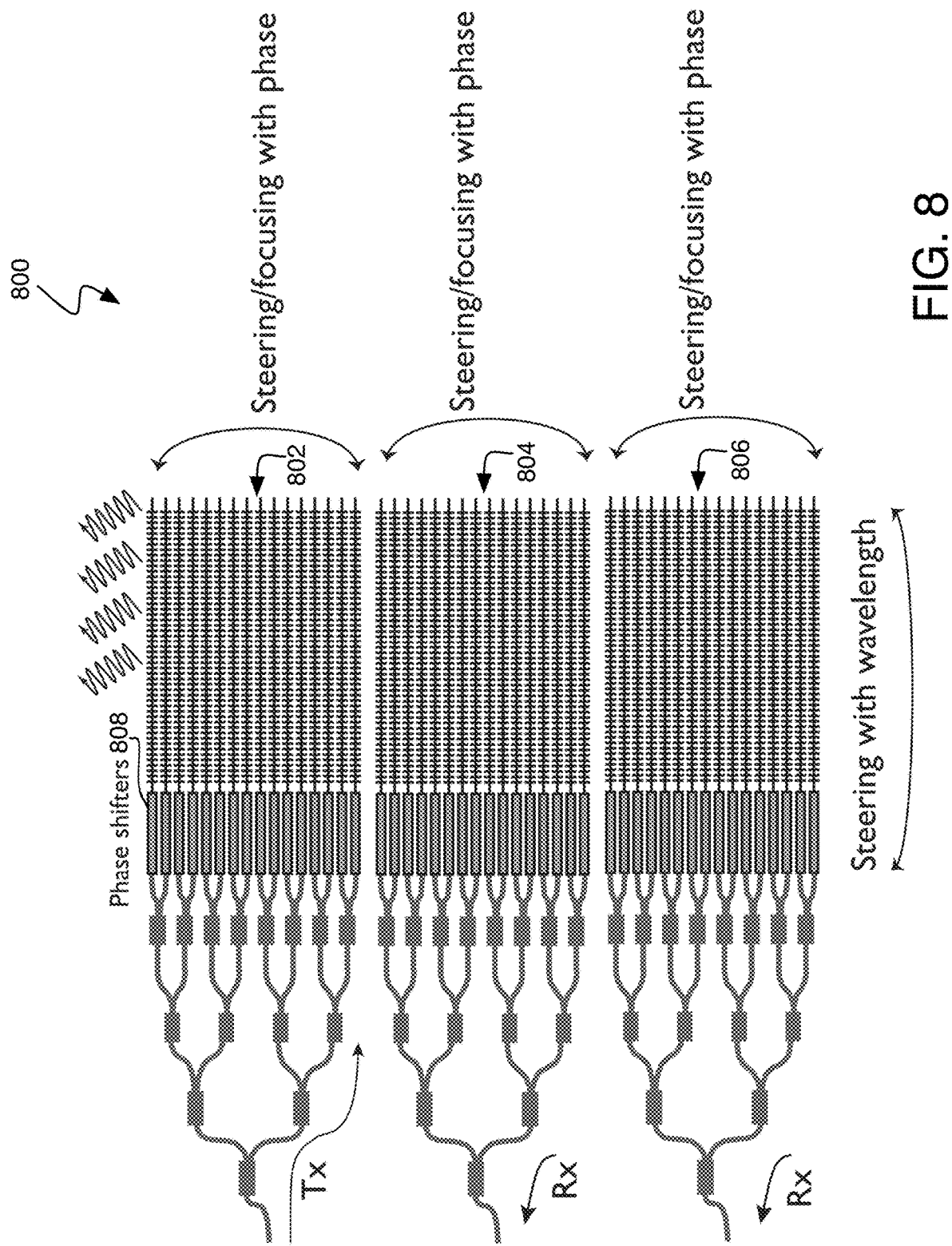

FIG. 8 shows an example of a portion of a multi-static aperture configuration for a coherent LiDAR system 800 that shows a beam steering and focusing arrangement and optical couplers for a transmission (Tx) OPA 802, and two receive (Rx) OPAs 804, 806. Steering can be performed along transverse (e.g., polar and azimuth) angular directions in a polar coordinate system, with the steering in one angular direction being performed by phase shifters 808 and the steering in the other angular direction being performed by wavelength (as shown in FIG. 8). The adjustment of the transmission angle for the Tx OPA 802 and the collection angles for the Rx OPAs 804, 806 in the phase-controlled angular direction can be dynamically performed as the phases imposed by the phase shifters 808 can be quickly tuned. The light beam transmitted by the Tx OPA 802 can have a nonlinear phase front imposed on it by the phase shifters 808. This dynamically adjusted phase front can also tune the focal depth of the Rx OPAs 804, 806.

Figure 9:
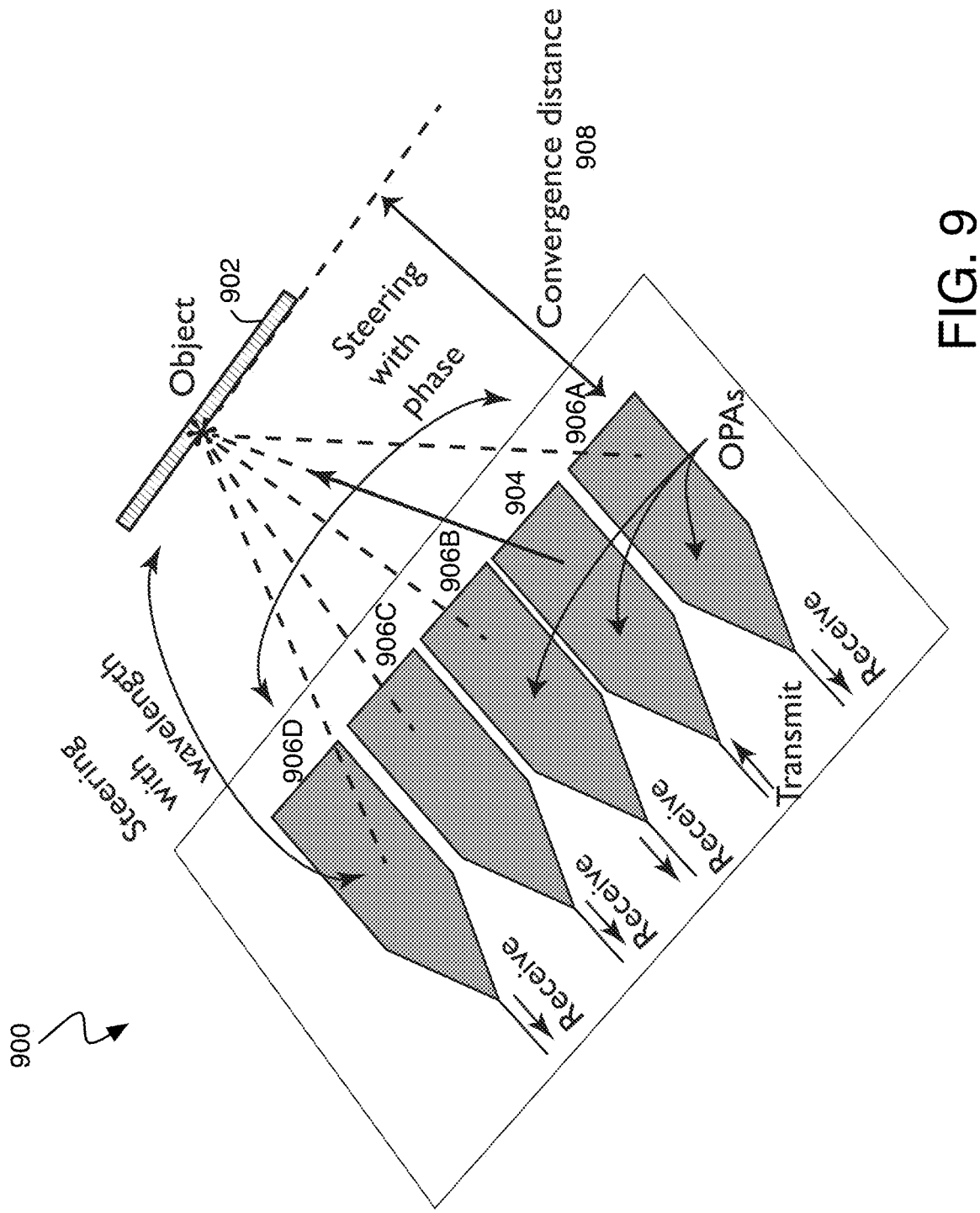

FIG. 9 shows an example of a portion of a multi-static aperture configuration for a coherent LiDAR system 900 that shows a transmission path to an object 902 from a transmit OPA 904 and resulting collection paths from the object 902 to receive OPAs 906A, 906B, 906C, 906D. The paths are spread within a plane that is parallel to an axis along which the apertures containing the OPAs are arranged. In this example, this plane is the same plane in which the phase-controlled angular direction is steered. These paths can be can be collectively configured such that they are aligned to a particular target location which in this example is shown hitting the target object 902 at a particular convergence distance 908. The OPAs can also be focused according to the assumed convergence distance 908.

In some implementations, the apertures within an aperture arrangement can be multiplexed for different center wavelengths (about which frequency modulation and/or frequency steering can be applied). In this manner, a wavelength division multiplexing (WDM) version of a multi-static aperture configuration can assign different combinations of apertures as a send aperture and corresponding receive apertures for different center wavelengths. So, operation for any given center wavelength is able to achieve the operating characteristics described above since the center wavelengths of each wavelength band are far enough apart, with appropriate guard bands between them, such that there is strong isolation (e.g., low leakage) between optical waves (and resulting signals) that use different center wavelengths.

Figure 10:
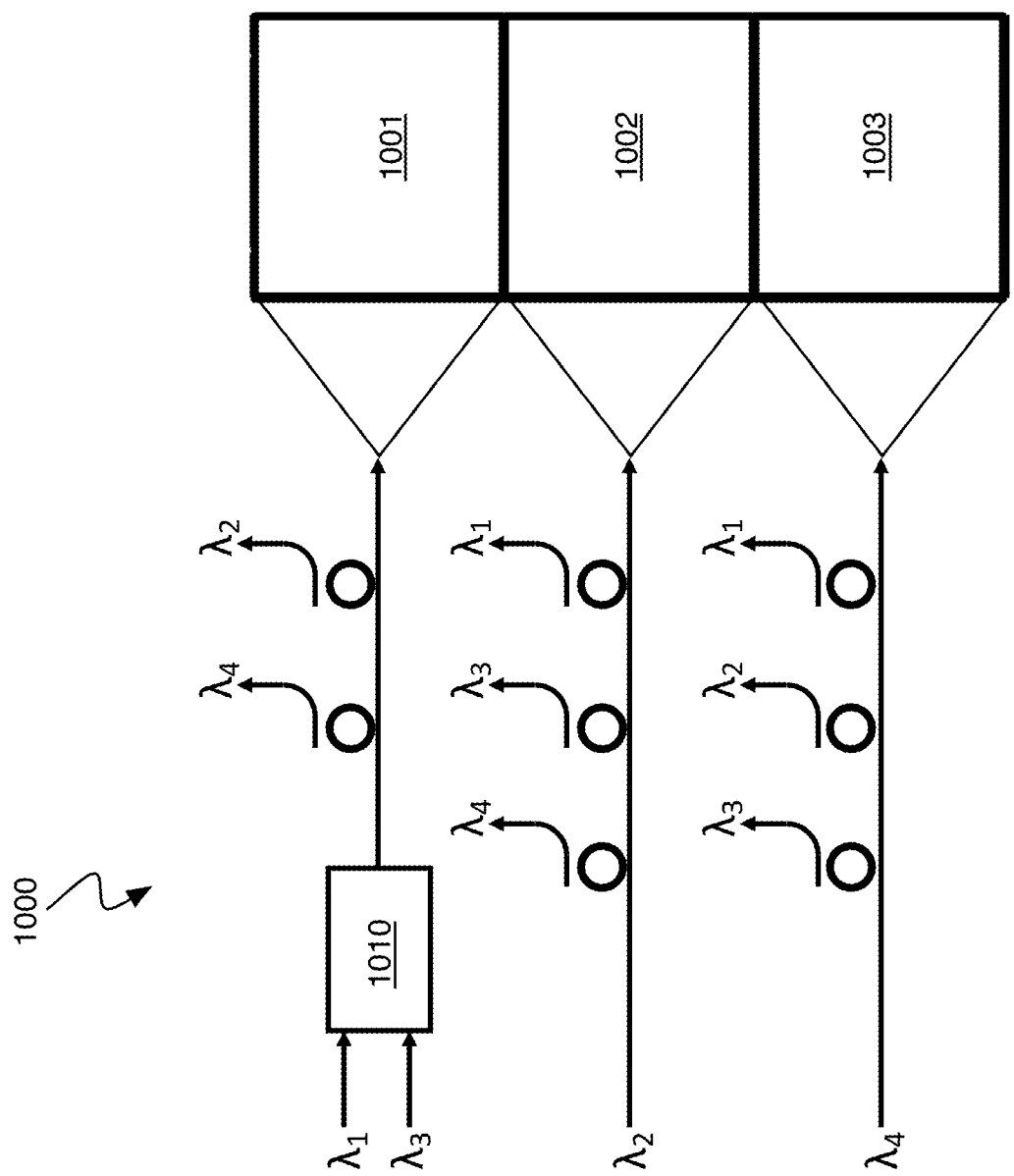
FIG. 10 is a schematic diagram of a WDM version of a multi-static aperture configuration.

FIG. 10 shows an example of a WDM version of a multi-static aperture configuration 1000 in which each aperture transmits a set of one or more wavelength bands and receives all other wavelength bands. In this example, there are four wavelength bands: a first band 1500 nm-1525 nm, a second band 1525 nm-1550 nm, a third band 1550 nm-1575 nm, and a fourth band 1575 nm-1600 nm. An appropriate portion of the ends of each band can be used as guard bands. Some apertures may use a WDM coupler to combine multiple wavelength band for transmission. For example, aperture 1001 combines first and third wavelength bands using a WDM coupler 1010, and apertures 1002 and 1003 each transmit only one wavelength band (the second and fourth bands, respectively), and thus do not use a WDM coupler. The optical pathways in this example include micoring resonators as directional wavelength filters. Alternatively, any other wavelength filters can be used on the receive path to select the wavelengths not transmitted for that aperture.

Some implementations of a multi-static coherent LiDAR system can be configured to use other forms of diversity in addition to, or instead of, the diversity provided by WDM, by using different optical waves that have different characteristics. For example, time-division multiplexing within different time slots can be used, polarization diversity can be provided by using orthogonal polarizations, and space diversity can be used by dividing the area of an aperture into different regions along a first dimension that are used for sending or receiving for different sets of apertures along a second dimension.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
    at least one transmitter comprising a send aperture configured to provide at least one beam of a transmitted optical wave along a transmission angle toward a target location;
    two or more receivers, each receiver comprising:
        a receive aperture arranged in proximity to at least one of the send aperture or a receive aperture of a different receiver,
        an optical phased array within the receive aperture, the optical phased array being configured to receive at least a portion of a collected optical wave arriving at the receive aperture along a respective collection angle,
        a detector configured to provide a signal based on the received portion of the collected optical wave; and
    circuitry configured to determine an estimated distance associated with the collected optical wave based at least in part on a combination that includes a respective component corresponding to each of two or more of the signals provided from the detectors of the two or more receivers.

2. The apparatus of claim 1, wherein each detector comprises a coherent detector configured to optically combine the received portion of the collected optical wave with a local oscillator optical wave to provide a combined optical wave and to detect the combined optical wave to provide the signal.

3. The apparatus of claim 2, wherein there is a frequency shift between the local oscillator and the transmitted optical wave to enable heterodyne detection in coherent detectors.

4. The apparatus of claim 2, wherein each signal comprises an amplitude and a phase angle, and the respective component corresponding to that signal comprises a quantity that is based on the amplitude and is independent from the phase angle.

5. The apparatus of claim 4, wherein the circuitry is configured to convert each signal to digital form and to process the signals in digital form to remove dependence on the phase angles.

6. The apparatus of claim 4, wherein at least one coherent detector is configured to use a first local oscillator optical wave to provide an in-phase combined optical wave and to use a second local oscillator optical wave shifted relative to the first local oscillator wave to provide a quadrature combined optical wave, and to provide the amplitude and phase angle in an In-phase/Quadrature (I/Q) space.

7. The apparatus of claim 4, wherein the circuitry is configured to perform a transform on a real-valued signal provided from one of the detectors to provide the amplitude and phase angle in a complex space of a resulting complex transform of the real-valued signal.

8. The apparatus of claim 2, wherein each detector is configured to generate a current that represents a difference between photocurrents generated by a pair of balanced photodetectors.

9. The apparatus of claim 1, wherein a total quantity of the receive apertures is between 3 and 20.

10. The apparatus of claim 9, wherein a total quantity of the receive apertures is between 4 and 10.

11. The apparatus of claim 9, wherein a total quantity of send apertures is 1.

12. The apparatus of claim 1, wherein an area of each receive apertures is equal to an area of the send aperture within a factor of between 4/9 to 9/4.

13. The apparatus of claim 1, wherein the receive apertures are arranged along an axis in a plane in which the optical phased arrays are configured to provide steering of the respective collection angles using phases of elements of the optical phased arrays.

14. The apparatus of claim 1, wherein each of the optical phased arrays of the receivers is configured to align the respective collection angle with the target location.

15. The apparatus of claim 1, wherein the transmitter comprises an optical phased array within the send aperture.

16. The apparatus of claim 15, wherein an area of each optical phased array within the receive apertures is equal to an area of the optical phased array with the send aperture within a factor between 4/9 to 9/4.

17. The apparatus of claim 15, wherein at least one optical phased array within the send aperture or at least one of the receive apertures is configured to steer a first angle using phases of elements of the optical phased array and to steer a second angle using wavelength.

18. The apparatus of claim 1, wherein the transmitter applies linear frequency modulation to the transmitted optical wave to enable the circuitry to determine the estimated distance.

19. The apparatus of claim 1, wherein the send aperture is further configured as a receive aperture in which an optical phased array is used to receive at least a portion of an optical wave having a different characteristic from a characteristic of the transmitted optical wave, and at least one of the receive apertures is used as a send aperture for providing a beam of an optical wave having the different characteristic.

20. The apparatus of claim 19, wherein the characteristic comprises at least one of: wavelength, time slot, or polarization.

21. A method, comprising:
providing at least one beam of a transmitted optical wave along a transmission angle toward a target location from a send aperture of a transmitter;
receiving a collected optical wave at receive apertures of two or more receivers, each receiver comprising:
a receive aperture arranged in proximity to at least one of the send aperture or a receive aperture of a different receiver,
an optical phased array within the receive aperture, the optical phased array being configured to receive at least a portion of a collected optical wave arriving at the receive aperture along a respective collection angle,
a detector configured to provide a signal based on the received portion of the collected optical wave; and
determining an estimated distance associated with the collected optical wave based at least in part on a combination that includes a respective component corresponding to each of two or more of the signals provided from the detectors of the two or more receivers.

* * * * *